J. T. LISTER.
DEVICE FOR RESILIENTLY SUPPORTING THE FRAMES AND BODIES OF VEHICLES.
APPLICATION FILED OCT. 24, 1910.
993,849.
Patented May 30, 1911.
2 SHEETS—SHEET 1.
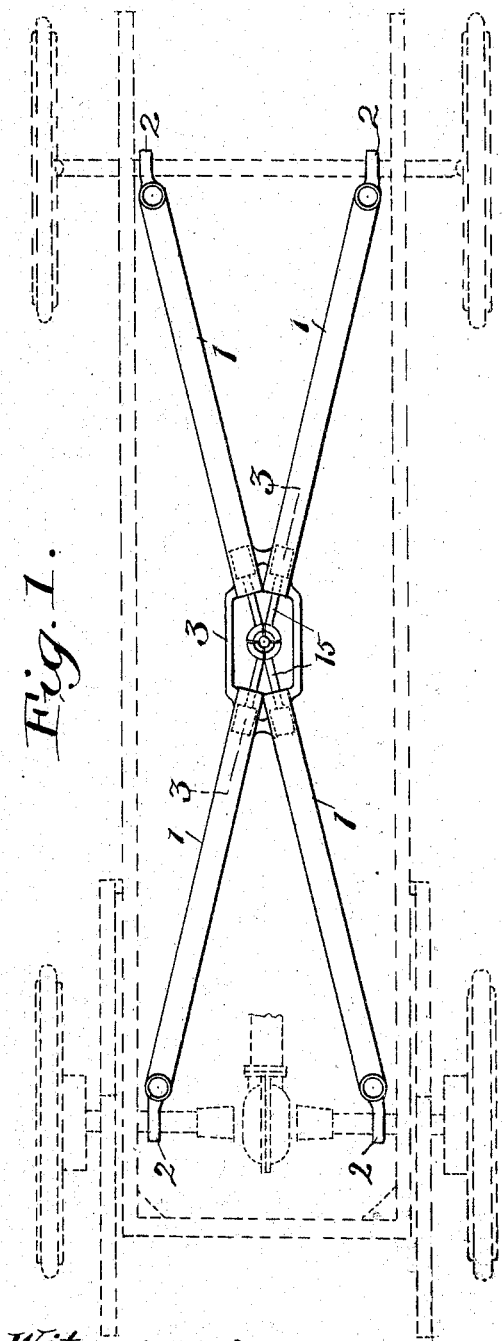
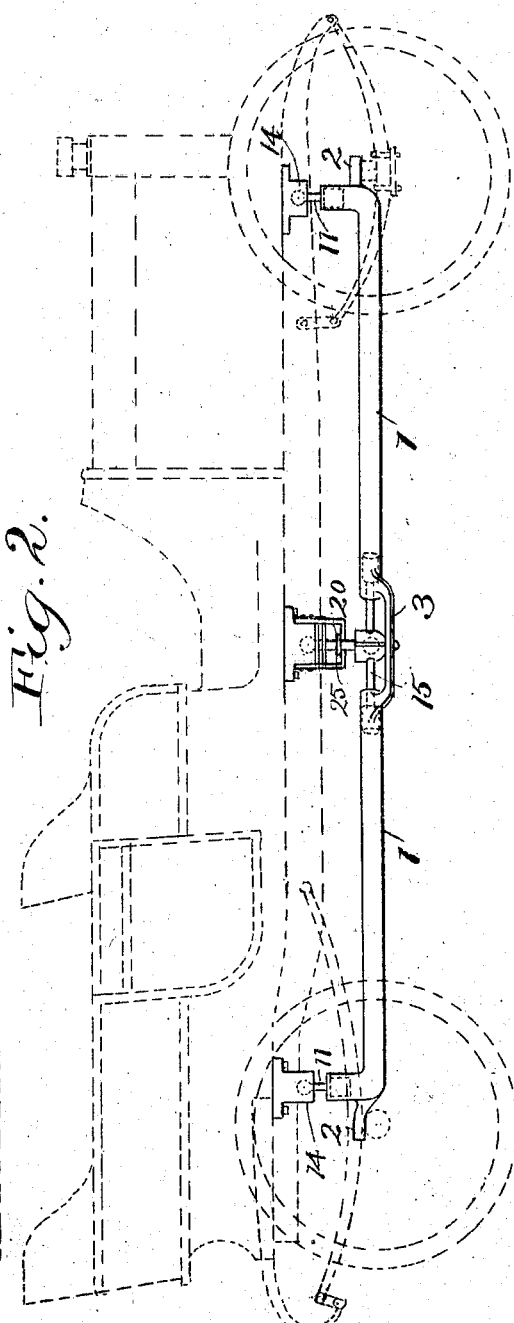

J. T. LISTER.
DEVICE FOR RESILIENTLY SUPPORTING THE FRAMES AND BODIES OF VEHICLES.
APPLICATION FILED OCT. 24, 1910.
993,849.
Patented May 30, 1911.
2 SHEETS—SHEET 2.
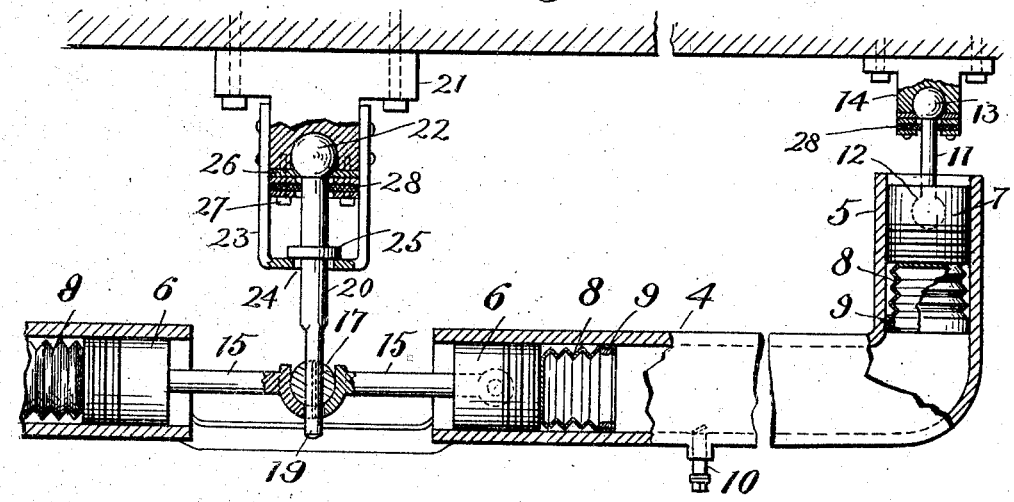
Fig. 3.
Fig. 4.
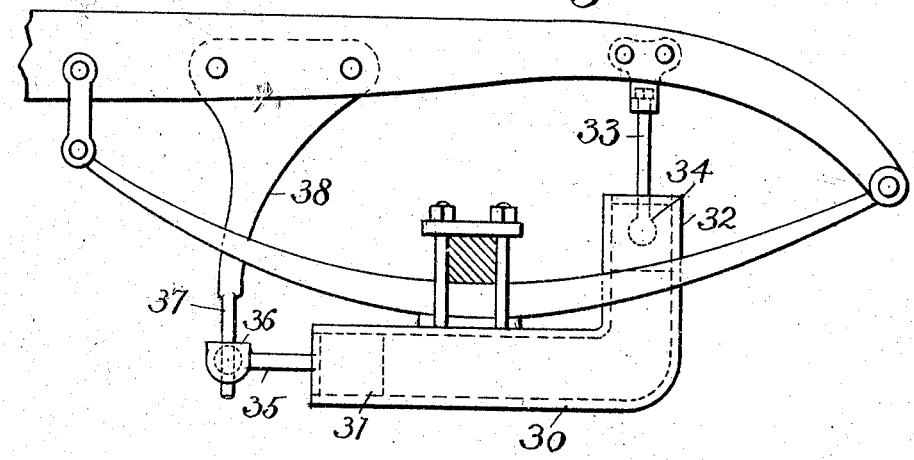
Fig. 5.
Witnesses.
E. B. Gilchrist
H. R. Sullivan
Inventor
John T. Lister
by Thurston & Kwis
Attys

UNITED STATES PATENT OFFICE.

JOHN T. LISTER, OF CLEVELAND, OHIO, ASSIGNOR OF THIRTY-FIVE ONE-HUNDREDTHS TO WORTHINGTON HOYT, OF CLEVELAND, OHIO.

DEVICE FOR RESILIENTLY SUPPORTING THE FRAMES AND BODIES OF VEHICLES.

993,849.

Specification of Letters Patent.

Patented May 30, 1911.

Application filed October 24, 1910. Serial No. 588,636.

*To all whom it may concern:*

Be it known that I, JOHN T. LISTER, a citizen of the United States, residing at Cleveland, in the county of Cuyahoga and State of Ohio, have invented a certain new and useful Improvement in Devices for Resiliently Supporting the Frames and Bodies of Vehicles, of which the following is a full, clear, and exact description.

My invention relates to a device for resiliently supporting the frame and body of a vehicle and is more especially adapted to the class of self propelled vehicles, which vehicles, as is well known, are subjected to sudden and pronounced jars and shocks while traveling over an uneven road. In my device, the resiliency is supplied by the compression and expansion of a confined body of air which through the intervention of suitable mechanism is acted upon at different parts thereof by movable pistons so that any stress to which the vehicle may be submitted is transmitted, equalized and absorbed, by the body of air.

The device is always used in addition to the usual vehicle springs but on the other hand, its use does relieve the necessity for using pneumatic tires. Therefore a vehicle equipped with this device may use any form of solid tire.

Of course, if desired, the pneumatic tires may be retained and in this event the use of my device will supply a pneumatic resilience in addition to that of the tires.

Generally speaking, the invention comprises the elements and combinations thereof set forth in the accompanying claims.

Reference should be had to the accompanying drawings in which—

Figure 1 is a top plan view of the chassis, axles and wheels of a motor vehicle and showing my device in position; Fig. 2 is a side elevation of the showing in Fig. 1, with the addition of the vehicle body indicated by dotted lines; Fig. 3 is a central vertical section along the line 3—3 of Fig. 1; Fig. 4 is a sectional view of a portion of the mechanism shown in Fig. 3; Fig. 5 is a sectional elevation showing a portion of the frame and axle with a modified form of my device in connection therewith.

In the device which is herein shown and described, the underlying thought and desired result is to support the frame or chassis of the vehicle and the body upon the axles by means of an interposed pneumatic device which will equalize and absorb such strains as the chassis and body may be subjected to as the vehicle travels over a road. If this can be successfully done, it relieves the need for pneumatic tires, for the pneumatic tires supply this resilient feature in motor vehicles as at present used. Air is the most suitable resilient agent to be employed under these circumstances, because it is universally resilient, responds quickly to pressure placed upon it, and communicates such pressure as is put upon it to all parts of the body of air which forms the cushion.

In working out this device, I have arranged the mechanism in such a manner that the vertical or up and down movement of the frame and body with respect to the axle, as well as the horizontal or longitudinal movement between the body and axle is taken care of with equal facility.

In Figs. 1 to 4, there is shown one form which the device may assume. As here shown, four tubular members 1 are provided which extend from substantially the center of the vehicle frame in diagonal directions toward the front and rear axles, and these tubular members are secured to the axles by means of brackets or straps 2 in any suitable manner to support them. These tubular members act as reservoirs, to confine a body of gas such as air. At their inner ends, the members 1 are held together by means of a bracket which is indicated at 3. The specific form of bracket here shown is not absolutely essential and therefore I do not limit myself to this showing. Any form of bracket which would engage with the tubular members and hold them in position relative to each other would be sufficient for the purpose. It will be observed that this bracket is not supported from the vehicle frame in any way but depends for the accomplishment of its purpose upon the efficiency of the securing brackets or straps 2. The bracket 3 provides an interior unobstructed space for a purpose which will be later described.

The individual tubular members 1 assume the shape which is shown in Fig. 3. That is to say, they are provided with an elongated body portion 4, and at the end are bent at right angles to provide the projecting portion 5. Within the opposite ends of the members are pistons 6 and 7 which cooperate with bellows 8. These bellows are of the accordion type, being closed at their outer ends which are in engagement with the pistons and at their inner ends are secured to rings 9, which rings are held within the tubular members 1.

Each tubular member 1 is provided with a valve opening 10 through which air or other gas may be introduced and pumped to a degree to produce the desired pressure. The pistons 7 are operatively connected with the chassis or body of the vehicle by means of the universal connection shown in Fig. 3, which consists of a link 11 having rounded heads 12 and 13 at its opposite ends. The head 12 is fitted within a complementary opening in the piston 7, while the head 13 is fitted within a socket formed with a member 14, which is carried by the chassis or the vehicle body. It will be obvious that this connection permits relative movement between the axle and the vehicle body in all directions, and when the direction of movement is vertical, be it ever so slight, the piston 7 is pushed inwardly and compresses the air within the reservoir or member 1, and as soon as the pressure is removed, the piston is forced out.

The pistons 6 which are at the inner ends of the tubular members 1 are provided with rigid piston rods 15. These piston rods at their outer ends are formed as segments of a hollow hemisphere, each segment being substantially a quarter of the hemisphere. Inasmuch as the piston rods are fixedly secured upon the piston 6, they will project toward each other in a line substantially coincident with the axis of the tubular members 1. Within the cup or hemisphere formed as previously described, a ball 17 rests, which ball is provided with an opening 18 and through this opening there projects the portion 19 of the pin 20. This pin is supported by means of a member 21 which is carried upon the body of the vehicle. At its lower end this member is provided with a socket into which fits the rounded end 22 of the pin 20. The member 21 has secured thereto a depending frame 23 which is provided with an opening 24 in the lower part thereof, through which the pin 20 extends. The opening 24 is of slightly greater diameter than the pin 20 so as to allow some play. Upon the pin 20 there is a flange 25 which normally rests upon the frame 23. The rounded end 22 of the pin is held in its socket by any suitable means and for the purpose I have shown a series of plates 26 which are held upon the member 21 by bolts 27. Suitably interposed in the plates is a felt washer 28 which encircles the rod 20 and prevents the entrance of dust that might otherwise collect between the ball and its socket.

There is an opening 29 through the lower side of the segments carried by the piston rods 15 for the purpose of allowing the portion 19 of the pins 20 to extend through the same. In practice, this portion 19 is free to move in a vertical direction so that purely vertical movement between the vehicle body and the axles does not affect this portion of the device. However, any movement in a horizontal plane between the vehicle body and the axles is responded to by the pin 20 which causes one or more of the cylinders 6 to move inwardly and compress the air which is within their respective tubular members 1.

It is a well known fact that the motions to which a vehicle is subjected in passing over a road are neither purely vertical nor purely horizontal. They are usually mixtures of both which result in very complex motions. But whatever may be the motions to which the vehicle may be subjected, the piston 7 will always take care of the vertical component of this motion, while the piston 6 will respond to the horizontal component of it.

In Fig. 5, I have shown a modified form of the invention which consists in securing an L-shaped tubular member 30, upon each axle adjacent to each spring. In the opposite ends of the tubular member are pistons 31 and 32, the piston 32 being connected with the frame by means of a rod 33 which is provided with a rounded head 34 fitted within the socket 32. The piston 31 is provided with a rigid piston rod 35 which is formed with a cup shaped end having a hole in the lower portion thereof. Within the cup is a ball 36 provided with an opening and through the opening and the opening in the cup there extends a rod 37 which is rigidly secured upon a bracket 38 carried by the frame of the vehicle. The operation of this device will be obvious, for it is substantially the same as that before described, the piston 32 taking care of all vertical movement between the axle and frame, while the piston 31 takes care of the horizontal movement. If desired, bellows similar to the bellows 8 and 9 may be used in connection with this device.

In the form of device just shown and described, each individual member 30 acts independently of the others, whereas in the device first explained, there is an interaction between the several subsidiary pneumatic reservoirs which proportionately distribute the strain and equalize it over all the vehicle.

The device while more particularly intended for use with motor vehicles, nevertheless is of more general application, and consequently I do not limit myself to the precise illustration and description, except as specifically embodied in the claims.

Having thus described my invention, what I claim is:

1. A device for resiliently supporting a vehicle body upon an axle, comprising a hollow tubular member, plungers within the hollow tubular member at opposite ends thereof, the one of said plungers being operatively connected to the body to respond to vertical motion, the other plunger being operatively connected to the body so as to respond to horizontal motion of the body, substantially as described.

2. A device for resiliently supporting a vehicle body upon an axle comprising a tubular reservoir, a vertically extending piston at one end of said reservoir, and a horizontally extending piston in the opposite end of said reservoir, the vertically extending piston being connected with the said vehicle body, causing the piston to move when there is relative movement between the axle and vehicle body in a vertical direction, the horizontal piston being operatively connected with the vehicle body, to cause the piston to operate when there is relative movement between the axle and the vehicle body in a horizontal plane.

3. The combination with a vehicle body, of a plurality of tubular bodies located upon the axles of a vehicle, vertically and horizontally reciprocating pistons at the opposite ends of each of the tubular bodies, and means for operatively connecting the said pistons to the vehicle body, substantially as described.

In testimony whereof, I hereunto affix my signature in the presence of two witnesses.

JOHN T. LISTER.

Witnesses:
A. J. HUDSON,
H. R. SULLIVAN.